United States Patent [19]
Cardillo

[11] Patent Number: 5,140,431
[45] Date of Patent: Aug. 18, 1992

[54] DIGITAL ELECTRONIC SYSTEM FOR HALFTONE PRINTING

[75] Inventor: Louis A. Cardillo, San Jose, Calif.

[73] Assignee: E. I. du Pont de Nemours and Company, Wilmington, Del.

[21] Appl. No.: 636,299

[22] Filed: Dec. 31, 1990

[51] Int. Cl.$^5$ .......................... H04N 1/21; H04N 1/40
[52] U.S. Cl. .................... 358/298; 358/456; 358/460
[58] Field of Search ............... 358/298, 456, 459, 460, 358/465, 466

[56] References Cited

U.S. PATENT DOCUMENTS

| | | | |
|---|---|---|---|
| 3,657,472 | 4/1972 | Taudt | 178/6.7 R |
| 3,688,033 | 8/1972 | Hell et al. | 178/15 |
| 3,997,911 | 12/1976 | Perriman et al. | 358/75 |
| 4,350,996 | 9/1982 | Rosenfeld | 358/75 |
| 4,447,833 | 5/1984 | Sano et al. | 358/460 X |
| 4,456,924 | 6/1984 | Rosenfeld | 358/75 |
| 4,499,489 | 2/1985 | Gall et al. | 358/75 |
| 4,528,693 | 7/1985 | Pearson et al. | 358/460 X |
| 4,692,879 | 9/1987 | Ikuta | 358/460 X |
| 4,805,033 | 2/1989 | Nishikawa | 358/298 |
| 4,969,053 | 11/1990 | Outa et al. | 358/298 X |

Primary Examiner—Benjamin R. Fuller
Assistant Examiner—Eric Frahm
Attorney, Agent, or Firm—Thomas H. Magee

[57] ABSTRACT

A system for producing an image by halftone printing generates halftone dots from electronic data by scanning across a raster of write spots in a recording medium, spot-by-spot and line-by-line. Each dot is defined within a repetitive dot template containing a plurality of write spots. The system writes at selective write spots by sending a present write-spot address signal obtained from a write-spot address register to a spot-status Look-Up-Table for selecting a predetermined value for each write spot, the predetermined value determining an on-off status for the present write spot. The spot-status Look-Up-Table has a plurality of predetermined values corresponding, respectively, to addresses of write spots within the dot template. In the present invention, the selective writing step is performed by sending the write-spot address signal also to a pointer Look-Up-Table for generating an address pointer signal uniquely associated with a particular write-spot address code, and transmitting the address pointer signal to the write-spot address register in order to obtain the next write-spot address signal.

12 Claims, 8 Drawing Sheets

FIG.5

|   | 0 | 1 | 2 | 3 | 4 | 5 | 6 | 7 | 8 | 9 |
|---|---|---|---|---|---|---|---|---|---|---|
| a |   |   |   |   | 255 | 225 |   |   |   |   |
| b |   |   |   |   | 205 | 185 |   |   |   |   |
| c |   |   | 175 | 110 | 65 | 75 | 105 | 165 |   |   |
| d |   |   | 155 | 85 | 45 | 55 | 95 | 145 |   |   |
| e | 250 | 190 | 130 | 40 | 5 | 10 | 30 | 135 | 210 | 240 |
| f | 230 | 220 | 140 | 25 | 20 | 15 | 35 | 125 | 195 | 245 |
| g |   |   | 150 | 100 | 50 | 60 | 90 | 160 |   |   |
| h |   |   | 170 | 120 | 80 | 70 | 115 | 180 |   |   |
| i |   |   |   |   | 200 | 215 |   |   |   |   |
| j |   |   |   |   | 255 | 235 |   |   |   |   |

FIG.6

| ADDRESS POINTER | ADDRESS POINTER | ADDRESS POINTER | ADDRESS POINTER | ADDRESS POINTER | ADDRESS POINTER |
|---|---|---|---|---|---|
| a4 | a5 | e0 | e1 | f6 | f7 | i4 | i5 |
| a5 | g2 | e1 | e2 | f7 | f8 | i5 | e0 |
| b4 | b5 | e2 | e3 | f8 | f9 | j4 | j5 |
| b5 | h2 | e3 | e4 | f9 | b4 | j5 | f0 |
| c2 | c3 | e4 | e5 | g2 | g3 | | |
| c3 | c4 | e5 | e6 | g3 | g4 | | |
| c4 | c5 | e6 | e7 | g4 | g5 | | |
| c5 | c6 | e7 | e8 | g5 | g6 | | |
| c6 | c7 | e8 | e9 | g6 | g7 | | |
| c7 | i4 | e9 | d4 | g7 | c2 | | |
| d2 | d3 | f0 | f1 | h2 | h3 | | |
| d3 | d4 | f1 | f2 | h3 | h4 | | |
| d4 | d5 | f2 | f3 | h4 | h5 | | |
| d5 | d6 | f3 | f4 | h5 | h6 | | |
| d6 | d7 | f4 | f5 | h6 | h7 | | |
| d7 | j4 | f5 | f6 | h7 | d2 | | |

DIGITAL ELECTRONIC SYSTEM FOR HALFTONE PRINTING

BACKGROUND OF THE INVENTION

This invention pertains to a digital electronic system for halftone printing and, more particularly, to a system for generating halftone dots using pointers to address a Look-Up-Table to determine the status (on or off) of individual write spots.

Halftone printing is a printing method whereby printed dots of different size per unit area are used to create a visual effect that simulates continuous tone gradations. All the dots in halftone printing have substantially the same printed optical density. It is the change in their individual size that changes the apparent optical density of an area. The human eye integrates the printed and not printed portions, and perceives that the overall tone gradation in that area changes continuously. True halftone reproduction employs dot patterns of different size dots placed on center lines of a preselected frequency. Other forms of halftone reproduction are also known, which employ dots of a fixed size but in different concentrations per fixed unit area to achieve varying optical densities. However for purposes of generalization, such methods may be viewed as comprising halftone dots of appropriate size along fixed centers, by defining the halftone dot to co-extend with the fixed unit area. Halftone printing has been extremely successful in providing inexpensive high-quality reproductions, both black and white (monochrome) and multicolored, of continuous tone images.

Halftone printing is not without problems, particularly in the reproduction of multicolored images where the complete color spectrum is reproduced using three, four, or even more fundamental colors printed sequentially and in superposed manner. For the final product to accurately reproduce the intended hues, the various dots for each color must be printed substantially over each other. Furthermore, if the pattern of dots is slightly shifted between one or more of the individual colors, moire patterns appear across the print. One solution is to print the various colors using plates on which the dot patterns are absolutely parallel and exactly aligned. These conditions are impractical to maintain in real life. Instead, it was discovered that hues can be maintained, and moire patterns eliminated, if the dots on the plates used for the different colors are placed on centers that form certain predetermined angles relative to each other. It has been found through trial and error that, for optimum results, the desired angles are ±15, 30, 45, and 60 degrees. Other orientations may of course be used if they are found to produce acceptable results. Even when monochrome reproductions are involved, the image appearance is improved when the dot centers are aligned at an angle rather than along one edge of the printed page and at 90 degrees thereof.

In traditional printing, the angled halftones are achieved by rotating the screens, used to produce the halftones, an appropriate amount during the exposure stage of a photosensitive film sheet, which then becomes the color separation transparency used to generate a printing plate. Any conceivable angle can be reproduced with minimal effort. With the advent of computers and electronic scanners which are used to read a continuous tone image and generate a set of digital data representing the three, four or whatever number of fundamental colors used in a specific application, the physical embodiment of the image has disappeared. The images that generate the color separations are electronic images maintained as a compilation of digital signals in a computer memory. The halftone color separation transparencies are produced by directly exposing a photosensitive film using data from a computer to drive a printer. Sometimes even this step is omitted and the printing plate is produced directly using computer-controlled, high-powered laser printers, thereby completely eliminating the need for a tangible color separation transparency. In order to produce a successful product, electronic equipment and/or software attempting to replace traditional techniques, must recreate the same image as would be produced using traditional screening processes. This includes generating halftone dots laid out on centers that are angled along similar angles as they would be had they been created by physically placing the screens over a photosensitive film at an angle and exposing the film therethrough.

In electronic printing, a continuous tone image is usually scanned with a scanner having a given resolution along two orthogonal directions substantially parallel to the image edges, assuming that the image is contained in a parallelogram, as is the usual case. The scanner output is recorded in digital format typically using an 8 bit system to produce a collection of numbers varying between 0 and 255, indicative of the apparent density of individual picture elements (PELs) representing the image. If the image is in color, filters are used to obtain multiple sets of data, each representing a fundamental color used in printing, such as cyan, magenta, yellow, and, in four color printing instances, black. Because the same treatment is applied to all colors in the halftone generation process, each color will be treated henceforth as a monochrome without regard to whether it is part of a multicolor system. Only the specific angle chosen for each color separation transparency changes. The accumulated data may undergo a number of alterations and modifications as part of electronic image processing; these alterations are of no import to this invention and depend on the sophistication of the work station in which they are effected, and the needs of the particular application. They may include color shifts, image blending, addition or deletion of text, etc. Following any such electronic data manipulation, the data are sent to a printer for the generation of the output. The output is a monochrome halftone representation of the image as subsequently modified.

Output printers almost always have substantially higher resolution capabilities than the input scanner. Thus, output laser printers may write with a resolution of 4,800 spots per inch, while read scanners may read and digitize data at resolutions such as 300 PELs per inch. As a result, there will typically be a number of fractional halftone dots included in each elemental area corresponding to the original continuous tone image. Furthermore, depending on the desired printing quality output, the color separation dots will be arranged on center lines at a spacing typically selected from 85, 100, 120, 133, 150 or 175 lines per inch; other frequencies may of course be used. In a system where the halftone dots are at 0° with a dot centerline spacing of 100 lines per inch and the writing resolution of the printer is 4,800 spots per inch, each dot will be constructed with a maximum of $48 \times 48 = 2,304$ spots, assuming that the printer affords equal resolution in both horizontal and vertical scan directions. Those 2,304 spots are available to generate any predetermined dot shape for any one of a maximum of 2,305 distinct density levels, to duplicate the density level of the original image (PELS) at that location. The total of these spots which may be used to create a dot will be referred to hereafter as a dot template. Thus, each dot template in this example consists of 2,304 spots.

In most printers, the write spot travels across a generally rectangular writing surface along a path substantially parallel to one edge of the surface. The surface is also advanced between lines in an orthogonal direction so as to produce an orthogonal raster pattern aligned with the surface edges. In order to more closely reproduce the traditional printing angles, in electronic halftone reproduction, it has been found advantageous to align the dot centers along center lines whose angle with the raster direction forms an angle that has a rational tangent. For instance, instead of 15 degrees, one would select 14.931 degrees; this is an angle whose tangent is 4/15. U.S. Pat. No. 3,657,472 discusses the rational tangent angle concept and associated advantages in detail, and to the extent needed in this case, its teachings are incorporated herein. Since the dot templates are aligned at an angle to the raster scan, the write spot which travels along the raster scan line, enters and exits each dot template at different points relative to the template itself. To determine the on or off status of the spot at each location, the prior art teaches two different approaches.

The first approach is based on defining a fundamental tile comprising a number of dot templates and partial dot templates. The image area is then divided into a multiplicity of fundamental tiles completely covering the image surface. The fundamental tile includes the minimum area that must be encompassed so that as the writing spot advances along a scan line, the spot always enters each tile at the same relative point, i.e., the pattern repeats. In the case of a 90 degree orientation, the fundamental tile comprises only one dot template consisting of the spots that are included in one halftone dot area. The scanning write spot always enters the dot template in the same relative location along each scan line. The on or off status of the spot may then be ascertained with reference to a Look-Up-Table (LUT) which, in the example of the 48×48 spots, is comprised of 2,034 values, one for each spot position within the tile.

In the case where the dot centers form an angle with the raster, the fundamental tile will consist of a larger area which will comprise a number of dot templates and partial dot templates which must be included to obtain a repeating pattern. Thus, a much larger look up table is needed to provide reference values for the spot status within the fundamental tile. For example, FIG. 2 shows a portion of a halftone print-out comprising dot templates, each consisting of 52 write spots, arranged in a pattern with center lines making an angle $\theta$ of 56.31 degrees with the scan line. The repeating tile pattern is outlined in FIG. 2, and encompasses 5 full dot templates and 16 partial dot templates extending over an area of 26×26 write spots. As a result, an LUT consisting of 676 values must be used to determine the spot status at each location within the tile. The number of LUT values needed for FIG. 2 is 13 times higher than the number of LUT values needed for a single dot template. In the case where the angle $\theta$ is about 30 degrees, a popular selection in the graphic arts, the stored data are one thousand, two hundred and eighty five times (1,285) larger than for a single dot. For a dot template consisting of 2,304 spots, the fundamental tile would require 29,952 and 2,960,640 values for $\theta = 56.31$ degrees and $\theta = 30$ degrees, respectively.

The second approach uses an algorithm to calculate the relative position of the spot within a fundamental dot tile and, thus, avoids such large Look-Up-Tables. In this case, a dot template is used which is oriented along the axes of a coordinate system defined by the angled dot centerlines. For each position along the scan line, a calculation (coordinate transform followed by modulo calculations) is performed to find where a spot is located in the angled dot template. The status of the spot is next determined with reference to a LUT which includes comparison values for all the spot locations within a single dot template. In the case of the 52 spot dot template of FIG. 2, the Look-Up-Table would only have 52 values. However, before the Look-Up-Table could be accessed, the address of the spot needs to be calculated.

Both approaches have limitations. As the angles change, the first approach can require exceedingly large amounts of memory to store the tile data. The second approach requires calculating circuitry and needs time to perform the calculation for each point. Neither approach presents a satisfactory solution for the electronic generation of angled halftones in a manner which is fast, inexpensive, and provides good flexibility in choosing different dot centerline angles.

It is an object of the present invention to provide a system for determining the status of a raster's write spot in an output device for the generation of halftone dots, which system does not use mathematical operations while at the same time limits the size of LUTs and the amount of data stored therein.

SUMMARY OF THE INVENTION

The present invention comprises a system for producing an image by halftone printing wherein halftone dots are generated from electronic data defining the image by scanning across a raster of write spots in a recording medium, spot-by-spot and line-by-line. Each dot is defined within a repetitive dot template containing a plurality of write spots. The system writes at selective write spots by sending a present write-spot address signal obtained from a write-spot address register to a spot-status Look-Up-Table for selecting a predetermined value for each write spot, the predetermined value determining an on-off status for the present write spot. The spot-status Look-Up-Table has a plurality of predetermined values corresponding, respectively, to addresses of write spots within the dot template. In the present invention, the selective writing step is performed by sending the write-spot address signal also to a pointer Look-Up-Table for generating an address pointer signal uniquely associated with a particular write-spot address code, and transmitting the address pointer signal to the write-spot address register in order to obtain the next write-spot address signal.

BRIEF DESCRIPTION OF THE DRAWINGS

FIG. 5 shows address codes and values used to construct dots of the type shown in FIG. 3.

FIG. 6 shows a pointer LUT constructed in accordance with the present invention for generating a dot pattern as shown in FIG. 3.

DETAILED DESCRIPTION OF THE PREFERRED EMBODIMENTS

Figure 1:
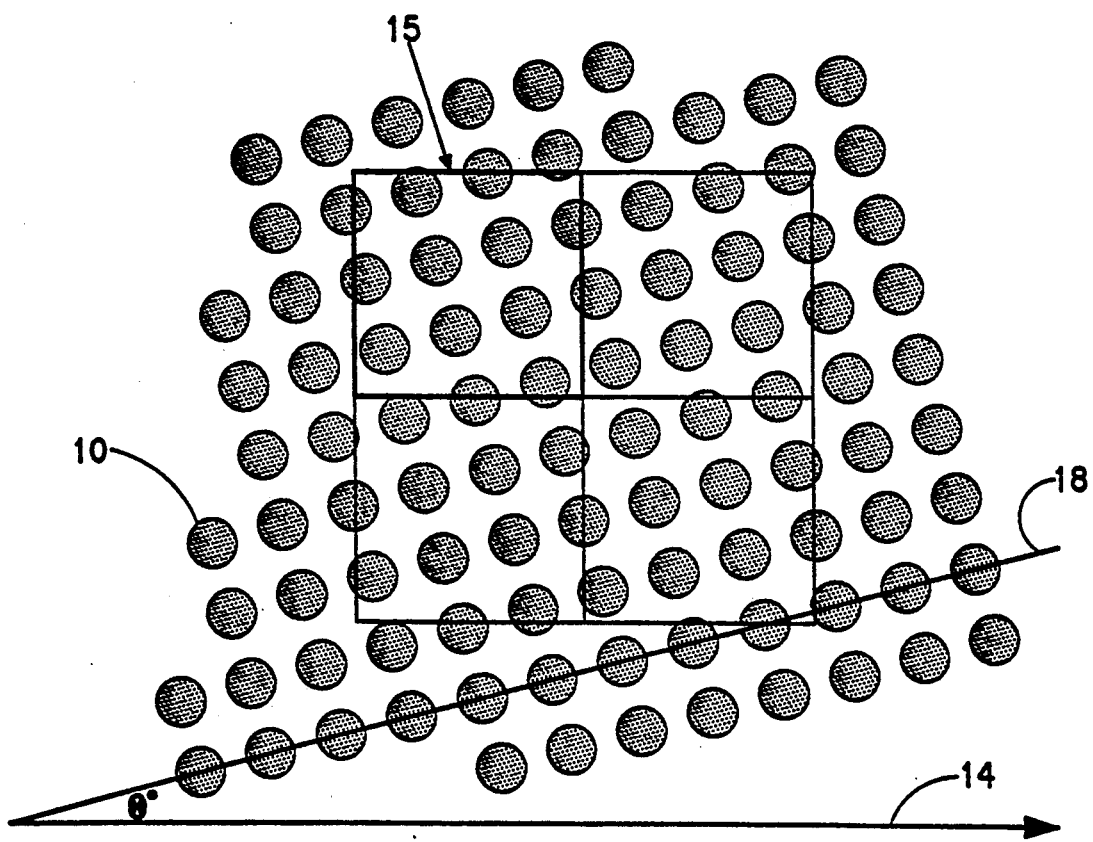
FIG. 1 shows an enlarged portion of a halftone printout illustrating dots, a fundamental tile, and dot centerlines.

FIG. 1 of the drawings shows, in greatly enlarged format, a typical halftone pattern to be generated with an electronic halftoning apparatus of the type comprising a raster scan imaging system, such as a cathode ray tube and associated means to produce and scan a focussed spot of luminous radiation in a raster fashion over an imaging medium. The apparatus further comprises means to modulate the radiation intensity. Such devices are well known in the art and need not be further described here. (See for instance the description of such a device in the aforementioned U.S. Pat. No. 3,657,472). The halftone pattern comprises a plurality of halftone dots 10 whose centers lie oriented along an axis 18 forming an angle $\theta$ relative to the direction of the raster, indicated by arrow 14. Four squares 15 are shown superposed on the pattern of dots 10, each square 15 covering an area that includes a multiplicity of dots 10. Each of the squares 15 represents a fundamental tile used by the prior art and discussed hereabove. It represents the smallest assemblage of dot templates that repeats in the scan direction.

Figure 2:
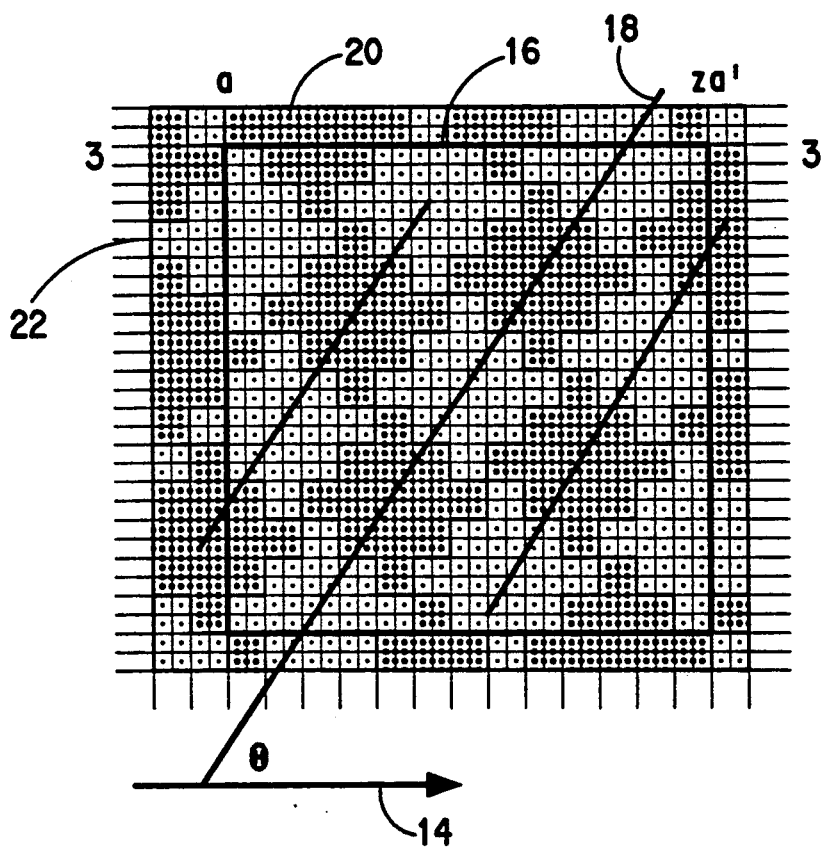
FIG. 2 shows another enlarged portion of a halftone printout illustrating dot templates, a fundamental tile, and dot centerlines, as well as raster scanning lines and spots.
Figure 3:
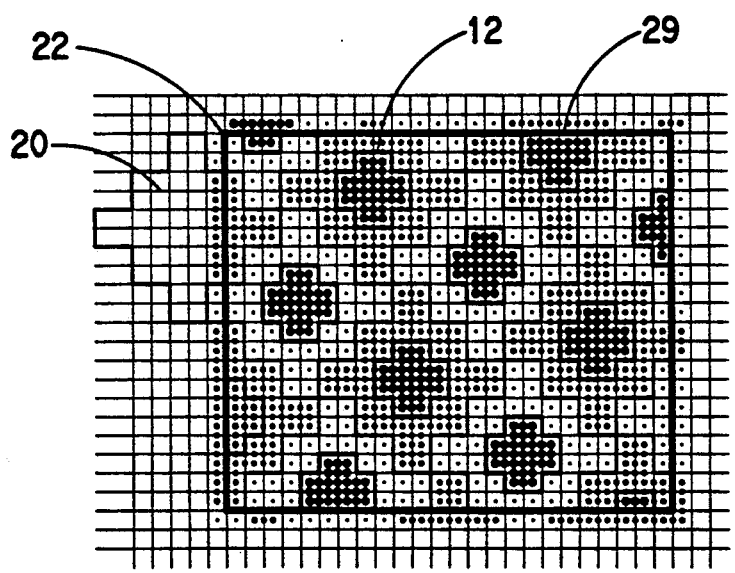
FIG. 3 shows a plurality of halftone dots representing an optical density upon which is superimposed the outline of a corresponding pixel.

FIG. 2 shows an enlargement of a fundamental tile 16. For illustration, dot templates 22 are shown in different density (shading) patterns. A scanning, write spot 20 is depicted as a square in this instance. It is understood that in reality the spot 20 is typically rounded, and that there is a certain degree of spot overlap. Similar to the earlier example, each dot template 22 consists of fifty-two spots 20. Depending on the apparent density of the original at that location, a number of the spots 20 within each template 22 will be turned on to form dots 12, as shown in FIG. 3. Since the illustration utilizes a square spot 20 and a limited number of spots 20 per dot template 22, the illustrated dots 12 have somewhat ragged edges. As the number of spots 20 per dot template 22 increases, the pattern more closely approximates the round dots 10 of FIG. 1. In this example, using the prior art technique, an LUT with 676 values is needed to determine the status of each write spot 20. In accordance with the present invention, however, the fundamental tile 16 and associated large Look-Up-Table are not needed. A study of the dot templates 22 over the raster pattern shows that the spot 20 on exiting a particular dot template 22 always reenters another template 22 at a predetermined same point, albeit not necessarily an adjacent or consecutive one.

Figure 4A:
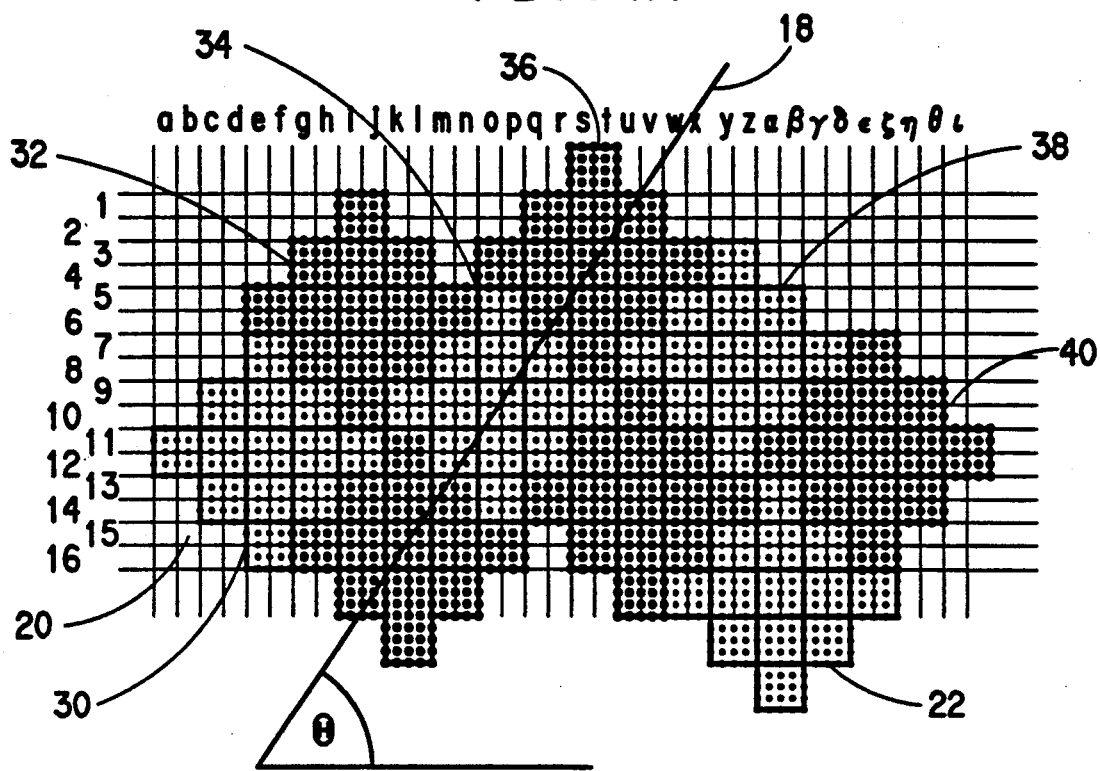
FIG. 4A shows in superposition a plurality of dot templates disposed over a raster pattern along with specific spot addresses.
Figure 4B:
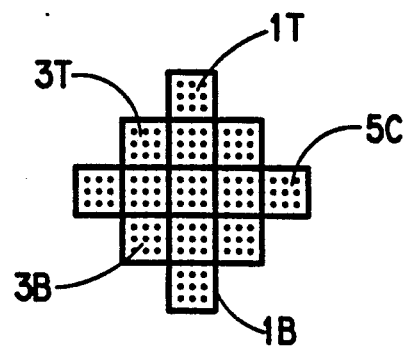
FIG. 4B shows an individual dot template as used in FIG. 4A.

FIG. 4A shows the dot templates 22 using different background shading. As the scanning write spot 20 travels along scan line 7 one notes that the spot 20 enters dot 30 at location "7,e". For simplicity in identifying template sections, the top four spots in each dot template 22 are labeled as 1T, the next 12 as 3T, the next 20 as 5C, the following 12 as 3B and the last 4 as 1B, describing the template 22 in terms of larger squares containing four write spots 20 each, as shown in FIG. 4B. As the scanning write spot 20 advances along scan line 7, upon exiting template 30 after "f,7", the spot 20 enters template 32 at "g,7", which is the beginning of the template section named 3B. The spot exits template 32 at "1,7" and enters template 34 at "m,7", which is at section 3T in the template 34. The spot exits template 34 and enters template 36 at "s,7", corresponding to section 1B in the template 36. It exits template 36 at "t,7", and enters template 38 at "u,7", which is at section 5C in the template 38. It exits at "δ,7" and enters template 40 at "ε,7" which is at the same point, i.e., section 1T, in the template 40 as for template 30, and the sequence of 1T, 3B, 3T, 1B and 5C repeats. Looking at the relative points of entry and exit in each case, one need only use one set of values to determine if the write spot 20 should be turned on or off—the values corresponding to one dot template, provided that we obtain both a status determining value selected from the Look-Up-Table and a pointer to the next address to look up in the table.

The pointer typically comprises a precalculated address for the next value selection, the calculation being based on the desired dot centerline angle and dot spacing distribution. The selected value may be a value which is predetermined to generate a particular dot shape. The status (on or off) of the spot is established by comparing the selected value and the image density at the point on the image corresponding to the spot address on the same image. The selected value may also be a direct spot status indicator, i.e., on or off, based on preselected dot shapes and density levels.

FIGS. 5 and 6 show a typical dot template and associated Look-Up-Table constructed in accordance with the present invention for dot templates that include 52 spots and form an angle $\theta$ as shown in FIG. 4A. In this example, the dot is built from the center out, as shown in FIG. 3, by comparing data from the continuous image PEL that overlays the particular location of the dot on the image to the dot template value, and deciding whether to turn the spot on or off. The values shown in FIG. 5 represent binary values in a Look-Up-Table for each template address, and the spot is turned on if the corresponding PEL value is under the value for that address. The dots 12 illustrated in FIG. 3 correspond to an overlaying pixel 29 whose value is 99. Following comparison of the spot LUT value with the PEL value, spot locations whose value is 100 or larger, that is, whose value exceeds that of the overlaying pixel, are turned on, while those of under 100 are off. FIG. 6 shows an associated Look-Up-Table which supplies pointers to guide the value selection process as the spot advances along a raster line. Thus, after the value from address "a4" is used, the value from address "a5" is selected, then the value from address "g2", then the value for "g3", etc.

The number of dot templates and portions thereof per raster line is precalculated on the basis of total spots available, and at the end of the raster line, a separate pointer directs the selection process back to whatever point corresponds to the beginning of the next raster line. The process is repeated until the full image scan has been completed. Regardless of the selected angle for the center line of the dots, provided rational angles are used in the angle selection, the size of the Look-Up-Table remains the same and is limited to the number of available addresses per dot template, plus a "horizontal" pointer for each address, plus a "vertical" pointer for each beginning of a new line address.

Figure 7:
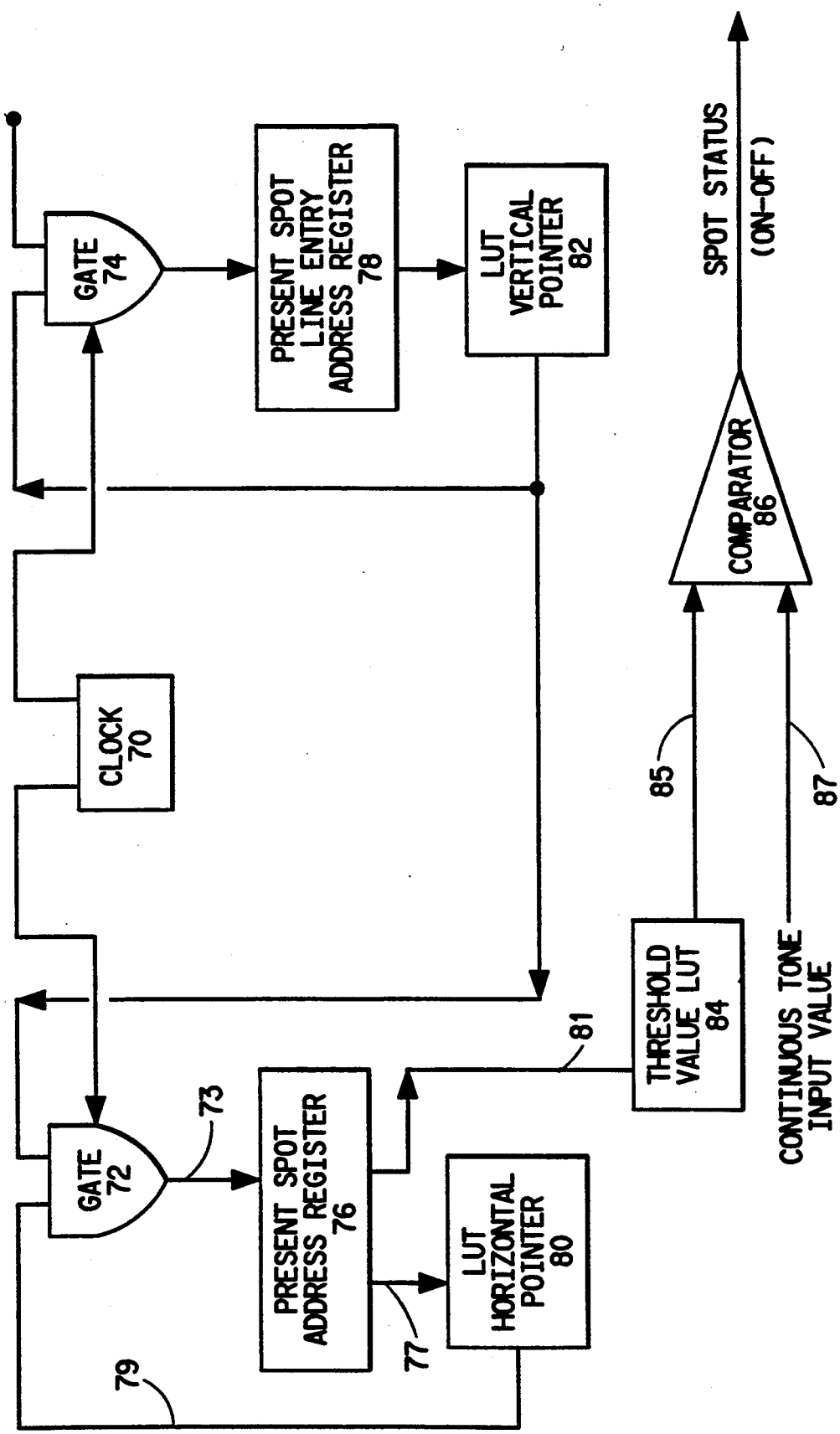
FIG. 7 shows a diagrammatic representation of the present invention.

FIG. 7 shows how this invention could be implemented using software, hardware or a combination thereof in a practical system. A clock 70 is used to control a gate 72 and a gate 74, and the same clock 70 is used to keep track of the position of the write spot on the raster track, both vertically and horizontally. At the beginning of the raster scan, two registers 76 and 78 are loaded with the address of the starting position within the template. These registers are used to keep track of the present spot position within the dot template. Spot-line entry register 78 is updated only at the end of a count corresponding to a full horizontal scan. The present spot position address in the register 76 is used to enter Look-Up-Tables 84 and 80 to obtain the first value and associated pointer giving the next address in the Look-Up-Table and resetting the register 76 to the new address from the pointer. The clock continues its count until the end of a scan line is reached. At that time the return address for the spot on the next line is obtained from LUT 82 and the clock switches the gate 72 to enter this address in the register 76, replacing the value therein by the output from the LUT 82 as the new present spot address. The same value is entered in the vertical register 78. The gate 72 is then switched back to the loop shown by arrows 73, 77, and 79 and the process repeated.

In addition to the next address obtained from the LUT 80, a comparison value associated with each address is obtained with reference to a second look up table 84 which provides threshold values that are used to determine if a spot will be turned on or off. Such a look up table is shown in FIG. 5. This second Look-Up-Table is shown separate from the pointer Look-Up-Table, however a single table with both values may be used. The comparison value is fed through path 85 to a comparator 86. A value indicative of the PEL value of the image to be reproduced, corresponding to the same point in the image, is also fed to the comparator 86 through path 87 from a source not shown in FIG. 7. Depending on the output of the comparator 86, the write spot is turned on or off.

Figure 8:
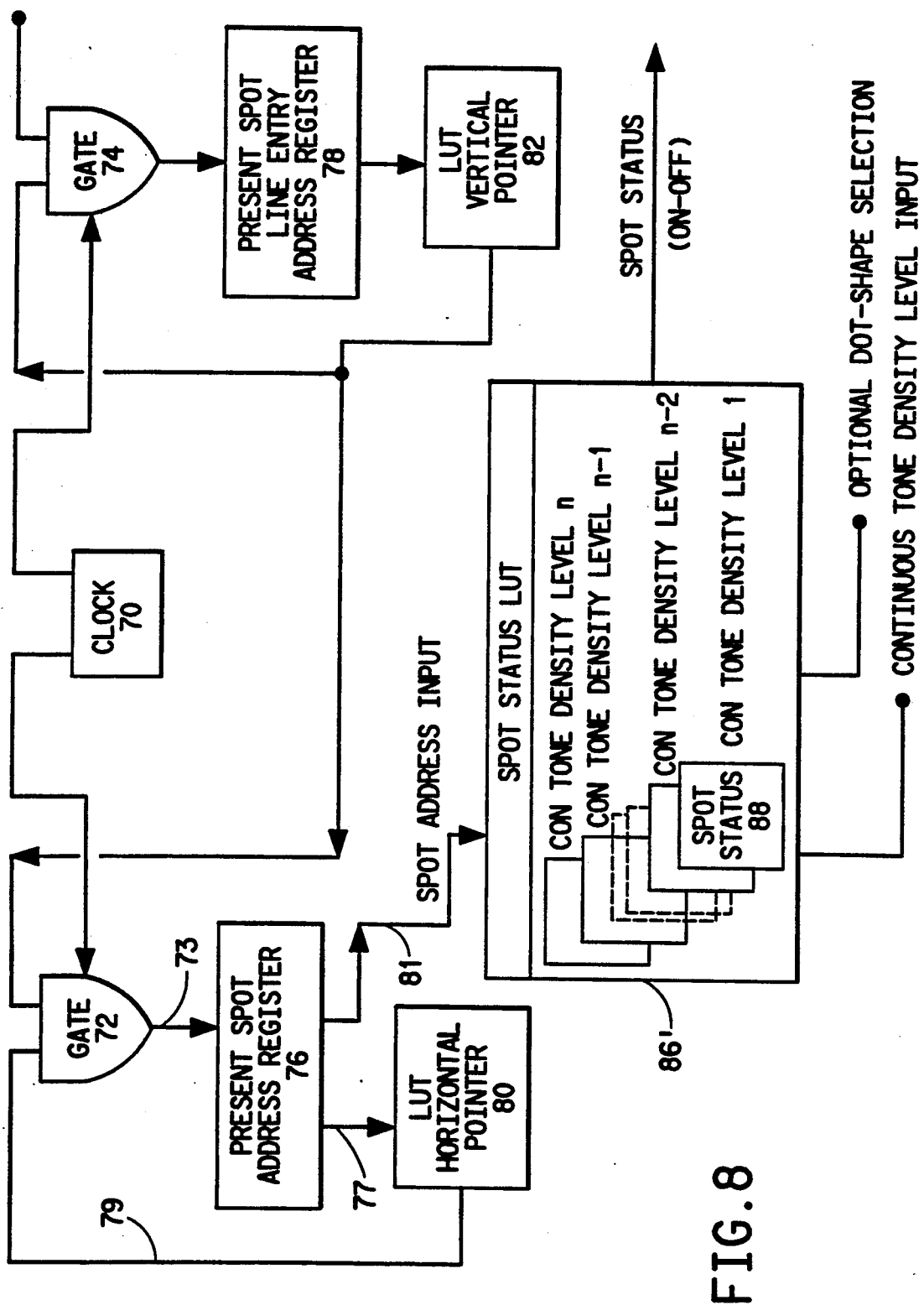
FIG. 8 shows an alternate diagrammatic representation of the present invention.

FIG. 8 shows a somewhat different way of generating dots, which schematically represents the best mode for practicing this invention. The address selection and pointer use are the same as before, however the manner of determining the spot status is different. In this embodiment, once the spot address within the dot template has been determined in register 76, this address is used to enter a Look-Up-Table 86'. Look-Up-Table 86' may be viewed figuratively as a three-dimensional table comprising a collection of cards, one card representing the dot shape for each density level. In an 8 bit system, there will therefore be 256 cards. Each card in turn will have a table representing the status of the spots that form the dot of this card.

The continuous tone PEL density-level value for the image area corresponding to the location of a spot is fed to the LUT 86, and the card corresponding to the density level at that image area is selected. The spot address within the dot template is then fed to the selected card and the spot status ascertained. The spot status, on or off, is retrieved and output to the printer. The cards are figuratively used as an explanation aid and, in practice, the system operates using a Look-Up-Table having three access inputs to uniquely identify each address.

The above dot generating method is faster than that using a comparator since it avoids the need for a calculation for every spot. In a further preferred embodiment, the on/off status of several spots underlying a single continuous tone PEL may be obtained in parallel from the Look-Up-Table, thus avoiding separate serially performed address look-ups to further speed the implementation. In this embodiment, the horizontal pointer LUT has pointers which "jump over" an equivalent number of spots corresponding to the number of spots being retrieved in parallel.

An added advantage is that more than one set of cards, representing more than one set of design dots, may be used interchangeably, allowing far greater flexibility in the creation of different halftone dot patterns within the same image to best suit the needs of the image. This is particularly true where the image is a composite of different originals some of which may best be reproduced by elliptical dots, while others may require rectangular ones.

What is claimed is:

1. In a method for producing an image by halftone printing wherein halftone dots are generated from electronic data defining said image by the steps of scanning across a raster of write spots in a recording medium, spot-by-spot and line by line, each dot being defined respectively within a repetitive dot template containing a plurality of write spots, and writing at selective write spots by sending a present write-spot address signal obtained from a write-spot address register to a spot-status Look-Up-Table for selecting a predetermined value for each write spot, said predetermined value determining an on-off status for the present write spot, said spot-status Look-Up-Table having a plurality of predetermined values corresponding, respectively, to addresses of write spots within said dot template, the improvement in said method comprising performing said writing step by the steps of sending said write-spot address signal also to means for generating an address pointer signal based on a desired dot centerline angle and spacing, the address pointer signal uniquely associated with a particular write-spot address code, and transmitting said address pointer signal to said write-spot address register in order to obtain a next write-spot address signal.

2. A method as recited in claim 1 wherein said means for generating said address pointer signal comprises both a horizontal pointer Look-Up-Table and also a vertical pointer Look-Up-Table, and wherein said transmitting step is performed by transmitting, through a first gate controlled by a clock, both a horizontal pointer signal obtained from said horizontal pointer Look-Up-Table and also a vertical pointer signal obtained from said vertical pointer Look-Up-Table to said write-spot address register.

3. A method as recited in claim 2 wherein said transmitting step also comprises transmitting said vertical pointer signal through a second gate, controlled by said clock, to a vertical line-entry address register for sending a present line-entry address signal to said vertical pointer Look-Up-Table.

4. A method as recited in claim 1 wherein said writing step comprises feeding to a comparator both said predetermined value selected from said spot-status Look-Up-Table and also a pixel density-level signal for an area in the image corresponding to a same point as the present write spot to generate an output value, and then selectively writing at the present write spot depending on the output value of said comparator.

5. A method as recited in claim 1 wherein said writing step comprises feeding to a said spot status Look-Up-Table a pixel density-level signal for an area in the image corresponding to a same point as the present write spot, said spot-status Look-Up-Table comprising a set of dot template cards representing different pixel density levels, each card representing a dot shape for a particular density level, and then selectively writing at the present write spot depending on the on-off status of the present write-spot ascertained from the dot template card associated with said density-level signal.

6. A method as recited in claim 5 wherein said writing step further comprises feeding to said spot-status Look-Up-Table a dot-shape selection signal for selecting a particular set of cards associated with said dot-shape selection signal, said spot-status Look-Up-Table comprising several sets of dot template cards representing different dot-shape designs, each set representing different pixel density levels for a particular dot-shape design.

7. In an apparatus for producing an image by halftone printing wherein halftone dots are generated from electronic data defining said image, including means for scanning across a raster of write spots in a recording medium, spot-by-spot and line-by-line, each dot being defined respectively within a repetitive dot template containing a plurality of write spots, and means for writing at selective write spots comprising a write-spot address register having an output thereof connected to an input of a spot-status Look-Up-Table for receiving a present write-spot address signal and selecting a predetermined value for each write spot, said predetermined value determining an on-off status for a present write spot, said spot-status Look-Up-Table having a plurality of predetermined values corresponding, respectively, to addresses of write spots within said dot template, the improvement in said apparatus comprising said writing means including means for generating an address pointer signal based on a desired dot centerline angle and spacing, the pointer signal uniquely associated with a particular write-spot address code, said generating means having an input connected to the output of said write-spot address register for receiving said write-spot address signal, and means for transmitting said address pointer signal to said write-spot address register in order to obtain a next write-spot address signal.

8. An apparatus as defined in claim 7 wherein said means for generating said address pointer signal comprises both a horizontal pointer Look-Up-Table having the input thereof connected to said write-spot address generator and also a vertical pointer Look-Up-Table, and wherein said transmitting means comprises a first gate controlled by a clock, said first gate having a first input thereof connected to the output of said horizontal pointer Look-Up-Table and a second input thereof connected to the output of said vertical pointer Look-Up-Table, the output of said first gate being connected to the input of said write-spot address register.

9. An apparatus as defined in claim 8 wherein said transmitting means also comprises a second gate controlled by said clock, said second gate having the input thereof connected to the output of said vertical pointer Look-Up-Table, the output of said second gate being connected to the input of a vertical line-entry address register, said vertical line-entry address register having the output thereof connected to the input of said vertical pointer Look-Up-Table for sending a present line-entry address signal to said vertical pointer Look-Up-Table.

10. An apparatus as defined in claim 7 wherein said means for writing at selective write spots further comprises a comparator having an output, a first input thereof connected to an output of said spot-status Look-Up-Table and a second input thereof connected to a source of a pixel density-level signal for an area in the image corresponding to a same point as the present write spot, the output of said comparator determining an on-off status for the present write spot.

11. An apparatus as defined in claim 7 wherein said spot-status Look-Up-Table has an input thereof connected to a source of a pixel density-level signal for an area in the image corresponding to a same point as the present write spot, said spot-status Look-Up-Table comprising a set of dot template cards representing different pixel density levels, each card representing a dot shape for a particular density level, wherein a status of the present write spot is ascertained from the dot template card associated with said density level signal.

12. An apparatus as defined in claim 11 wherein said spot-status Look-Up-Table also has an input thereof connected to a source of a dot-shape selection signal for selecting a particular set of cards associated with said dot-shape selection signal, said spot-status Look-Up-Table comprising several sets of dot template cards representing different dot-shape designs, each set representing different pixel density levels for a particular dot-shape design.

* * * * *